Patented Feb. 14, 1939

2,147,487

UNITED STATES PATENT OFFICE 2,147,487

FERMENTATION PROCESS FOR SOLVENT MANUFACTURE

Horace Edward Hall, Sea Cliff, N. Y.

No Drawing. Application January 11, 1935, Serial No. 1,309

12 Claims. (Cl. 195—44)

This invention relates to the production of alcohols and acetone by fermentation processes, and the present case, which is a continuation-in-part of my copending application Ser. No. 510,067, filed January 20, 1931, has for one of its objects to obtain large yields of butyl alcohol, ethyl alcohol, acetone and commercially valuable by-products of the fermentation of water solutions or suspensions of carbohydrates in the presence of a specific organism under commercially controllable conditions, as will be set forth in detail herein.

Another object of this invention is the utilization of the many forms, mixtures, solutions and suspensions of commercially obtainable, fermentable carbohydrates by simple and inexpensive preliminary preparations and procedures to the end that the contained carbohydrates are fermented by Bacillus butacone and converted, in large proportion, into useful chemical products.

Another object of this invention is the production of a solvent mixture containing high percentages of butyl alcohol in a continuous and uninterrupted manner whereby no precautions need be taken to exclude air from the system and whereby previously sterilized mash concentrates are diluted to final concentration with ordinary unsterile tap water.

Another object of my invention is the utilization of proteins extracted from animal sources which are found, when used in proper mixture, to materially and markedly aid the butyl alcohol fermentation in two important respects, namely:

1. Fermentations are accelerated and therefore the time of solvent production is reduced in many instances by as much as one-fourth of the time ordinarily consumed where using vegetable proteins and the now known butyl alcohol producing species.

2. Yields of useful solvents are materially increased when using animal proteins coupled with my procedure as herein outlined.

I have found that Bacillus butacone when operating under the conditions and limitations of this invention is highly resistant to the adverse action of the ordinarily encountered and greatly feared lactic acid producing contaminants. In the past it has been found necessary to add greatly to the process expense by severe and prolonged sterilization treatments which frequently damaged and rendered unfit considerable percentages of the useful carbohydrates contained in the mash. Other butyl alcohol producing species were found to possess little if any ability to successfully combat the action of lactic acid contaminants even though the latter were originally present in only minute amounts. Bacillus butacone, on the other hand, if developed and fostered under the conditions set forth is capable of completely resisting and overcoming the adverse action in the final mash of concentrations of lactic contaminants which are evidenced and measured in relative degree by their prolific growth on agar plate surfaces in 24 hour periods.

My invention comprehends broadly the use of carbohydrates of the class consisting of starches and sugars, preferably in water solution or suspension. Carbohydrates of the said class which are useable in this process and which are found in suitable quantity in commercially available raw materials are sucrose, dextrose, fructose, levulose, mannose, glucose, etc., as well as starch, dextrin, etc. Commercially available raw materials containing suitable percentages of such carbohydrates include refuses and juices obtained from saccharine or amylaceous extracts of sugar cane, beets, corn, potatoes, etc., such as the juices or water extracts obtained from sugar refineries, food products plants and canneries, etc., or from subsidiary or by- or end-products arising from the treatment of the carbohydrate containing materials in connection therewith or arising therefrom. My invention, however, is not limited to use of the aforesaid carbohydrates or sources of raw material which are noted for purposes of illustration, but embraces use of all carbohydrates of the class consisting of starches and sugars. Such materials and products where deficient in useable nitrogenous matter are used in conjunction with animal protein or mixtures of animal and vegetable proteins and submitted to the action of Bacillus butacone in accordance with the procedure herein outlined.

Bacillus butacone, a hitherto undescribed organism, was isolated by me and is fully and unmistakably described as follows:

The bacteria were isolated first by me from humus, and the following are the details of one method of isolation, given merely for purposes of illustration. Small portions of the humus were added to sterile potato (5%), dextrose (1%) tubes, the tubes were heated for 5 minutes at 100° C., and incubated at 37° C. for a period of 48–72 hours. Frequent observations were made during the incubation period and those tubes showing evidence of gas evolution and lifting of the potato particles were selected. Such tubes were then examined for odor of butyl alcohol and those with the most pronounced and characteristic odor were set aside for spore fermentation. After about ten days the tubes thus selected were submitted to heat-treatment for five minutes in boiling water. Portions withdrawn were use to inoculate potato (5%) tubes which were then incubated at 37° C. for 48–72 hours. This procedure was several times repeated. Further selection was made and those tubes showing most vigorous growth and evidencing the most distinctive odor of butyl alcohol were in each case selected and reserved for further treatment. As a final step in culture purification and in order to eliminate the possibility of the survival of other known butyl alcohol species, portions of the above final potato tubes were transferred into sterile humus tubes which were retained and later, as occasion demanded the use of a fresh and finally purified culture, one of these humus tubes was selected and immersed, nearly up to the plug, in vigorously boiling water for a minimum period of 45 minutes. Portions of the heated humus mixture were then withdrawn, under aseptic conditions, and used to inoculate sterile potato, dextrose tubes which were incubated and which invariably resulted in the development and growth of vigorous and efficient cultures. I have frequently increased the time of heating the humus tubes up to and including two hours and a half without killing or impairing the *Bacillus butacone* spores.

After obtaining pure cultures of *Bacillus butacone*, the characteristics of the organism were studied under a variety of conditions as to nutrient media, temperature and time factors, and the results obtained compared with descriptions in the literature of various butyl alcohol producing species, and also with our practical experience with many of these species. The evidence supporting my claim to the discovery of a new species was overwhelming.

The following is a list of the more important butyl alcohol organisms described by others and experimentally or otherwise compared by me with *B. butacone* as to properties, reactivity, virility and morphology.

(1) *Clostridium butyricum*, "Prazmowski" (Botan. Zeitung, 1879, 37, 409); (2) *Vibrion butyrique*, "Pasteur" (Compt. Rend. 1861, 52, 344); (3) *Butylicus amylobacter*, "Tiegham" (Bull. de la Soc. Botan. de Francais, 1877, 24, 128); (4) *Bacterium navicula*, "Reinke & Berthold" (Botan. Laborat. d. Univ. Gottinger, 1879); (5) *Bacillus butylicus*, "Fitz" (Ber. d. Deutsch. Chem. Ges. 1884, 17, 1188); (6) *Butyl bacillus E*, "Buchner" (Zeits. f. Physiol. Chemie, 1885, 9, 380); (7) *Bacillus amylobacter I*, "Gruber" (Centralbl. f. Bakt. 1887, I, 367); (8) *Bacillus amylobacter II*, "Gruber" (Centralbl. f. Bakt. 1887, I, 367); (9) *Bacillus amylocyme*, "Perdix" (Ann. d. l'Institute Pasteur 1891, 5, 287); (10) *Bacillus butyricus*, "Botkin", (Zeit. f. Hyg. 1892, 11, 421); (11) *Granulabacter saccharabutyricum*, "Beijerinck" *Granulabacter lactobutyricum*, (Verhandl d. k. Akad. v. Wetenschappen Tweede Sectie Deel I, Amsterdam 1893); (12) *Bacillus orthobutylicus*, "Grimbert" (Ann. de l'Inst. Pasteur 1893, 7, 353); (13) *Amylobacter butylicus*, "Duclaux" (Ann. de l'Inst. Pasteur 1895, 9, 265); (14) *Granulobacter butylicum* "Beijerinck" (Arch. Neerland 1896, 29, I); (15) *Bacillus sacchrobutyricus*, "Kecki" (Centralblatt f. Bakt. 1896, abst. part II, 169); (16) *Motile buttersaure bacillus*, "Grassberger & Schattenfroh" (Arch. f. Hyg., 1902, 42, 219); (17) *Glostridium der Heutroste*, "Behrens" (Centralbl. f. Bakt., 1902, abt. part II, 8, 114); (18) *Clostridium pastorianum*, "Winogradsky", (Centralbl. f. Bakt. 1902, part II, abt. 9, p. 43); (19) *Plectridium plectinovorum*, "Stormer" (Centralbl. f. Bakt. 1904, part 11, abt. 13, 171); (20) *Clostridium giganteum*, "Kentner" (Wissensch. Meeresuntersuch. N. F. 1904, 8); (21) *Clostridium americanum*, "Pringsheim" (Centralbl. f. Bakt. 1906, part II, 16, p. 795); (22) *Granulobacter pectinovorum*, "Beijerinck & Van Delden" (Arch. Neer 1906, 9, Ser. II, 8); (23) *Granulobacter urocephalum*, "Beijerinck & Van Delden" (Arch. Neer 1906, 9, Ser. II, 8); (24) *Alcohol-forming clostridium* of Shardinger (Cent. f. Bakt. II, 1907, part II, 18, 748); (25) *Bacillus amylobacter* "Bredemann" (Cent. f. Bakt. 1909, 23, part II, 385); (26) *Bacillus acetobutylicum*, "Horton" (U. S. P. 1,427,595, 1922).

The following descriptive outline was prepared according to the chart of the Society of American Bacteriologists.

*Descriptive chart*

Source: Long Island humus.
Date of isolation: 1923–24.
Name: *Bacillus butacone*.

*Morphology*

Vegetative cells: Medium, 5% corn mash. Temperature, 37° C. Age: Twenty-four hours. Form: Short rods. Arrangement: Rafted. Limits of size: 0.5–1.0 by 2.0–7.5 microns. Size of majority: 1.0 by 3.0 microns. Ends: Blunt. Stained with carbol fuchsine, also with methylene blue.

Sporangia: Present. Medium: 5% corn mash. Age: 48 hours. Temperature: 37° C. Form: Cigar-shaped. Size: 1.5 by 7.5 microns.

Endospores: Present. Location: Eccentric. Form: Elliptical. Size: 2.0 by 2.75 microns.

Motility: Motile when young. Flagella: Peritrichiate.

Irregular forms: Regularly present cells swollen to abnormal lengths with acutely pointed ends.

Staining reactions: Methylene blue: Deep blue. Gram Stain: Usually positive but frequently negative.

Aerobic agar stroke: No growth.
Gelatin stab: No growth or liquefaction.
Dextrose agar: (Anaerobic tubes). Creamy white columns, 1–2 mm., gas produced.
Carbohydrates fermented: Glucose, sucrose, fructose, lactose, levulose, mannose, xylose, arabinose, starch, dextrin.
Nutrient broth: No growth.
Potato: Abundant growth with odor of butyl alcohol.
Litmus milk: Moderate growth.
Nitrogen: Animal protein best.
Best medium for growth: 3% dextrose.
Best medium for colony formation: Potato. Dextrose agar.
Quick differential test: Unusual resistance to heat in spore form. Will withstand 100° C. for 45–190 minutes.
Pathogenicity: Non-pathogenic
Acids produced: Acetic and butyric. No lactic acid.
Alcohols produced: Primarily butyl and ethyl.
Acetone: Produced.
Optimum pH: Range 4.8 to 6.7.
Lactic acid production: No production of lactic acid.
Miscellaneous biochemical reactions: Facultative anaerobe. Nitrates not reduced and no gas formed.
Temperature Relations: Optimum temperature for growth 37° C. Maximum temperature for growth 46° C. Minimum temperature for growth about 20° C.

Chromogenesis: Potato—yellow to orange.

Production of Indol: Medium: Tryptophane broth (Difco). Indol absent.

In carrying my invention into effect I take a known amount of raw-material, dilute with water to a free flowing consistency, whenever the raw material is deficient in nitrogen, I admix a proportion of matter containing animal protein or a mixed animal and vegetable protein, submit the mixture to sterilization by heat, add cold tap water to bring the mixture to proper concentration and temperature, inoculate with a bacterial culture and allow the final mash to ferment at 37° C., until gas evolution has substantially ceased. The products of reaction are finally removed by distillation or other suitable means.

More specifically, I take a known weight of raw material such as black strap molasses, dilute with approximately an equal volume of water, if the same is deficient in available nitrogen I then add thereto animal protein or mixed animal and vegetable protein in the approximate ratio of one-half to one part of protein to one hundred parts of raw material by weight. The mixture is submitted to sterilization by heat, care being exercised that the heat treatment is not sufficiently severe to cause undue caramelization. A sterilization period of 20 to 45 minutes with steam pressure of approximately 15 pounds is usually adequate and yet not sufficiently prolonged nor severe as to cause undue caramelization of the sugars. The sterilized mixture is now diluted with tap water of such temperature that when the final carbohydrate concentration of 3% to 5% is reached, the temperature of the mixture is 37° C. or slightly above. This adjusted mixture is now inoculated with a previously prepared culture of Bacillus butacone and the whole allowed to ferment at 37° C. until gas evolution has substantially ceased. The solvents may then be removed and refined by distillation procedure. The approximate average ratio of solvents produced is 65% butyl alcohol, 28% acetone and 7% ethyl alcohol. Carbon dioxide and hydrogen are the principal gases evolved.

The volume ratio of inoculent to final wash is found effective where the inoculent is approximately one-twentieth to one-sixtieth of the volume of the final mash.

The culture of Bacillus butacone may well be prepared as follows: One of the previously mentioned humus spore tubes is heated for 45 minutes or longer in boiling water and then a portion is transferred, under aseptic conditions, to a tube containing sterile potato (5%), dextrose (1%), and water. This tube is incubated at 37° C. for 24 hours and then a portion is used to inoculate approximately 125 cc. of sterile potato (5%) mash. This 125 cc. portion is incubated for 24 hours and a major portion used to inoculate approximately 1 litre of sterile corn (5%) mash. This corn mash is then incubated for 24 hours and used in major part to inoculate a ten litre sterile 5% corn mash mixture which in turn is incubated for 24 hours and used in part as inoculent for 50 gallons of 5% corn mash. After 18 to 24 hours of fermentation at 37° C. this inoculent is sufficient to use in connection with 1500 gallons or more of previously prepared molasses mash. It is also suitable for use as inoculant in connection with like quantities of corn mash or other carbohydrate containing raw material selected and prepared for fermentation use. Wherever the incubation or fermentation temperature has not been specified it is understood to be approximately 37° C. Temperatures ranging from 34° C. to 40° C. may be used with good results.

The following illustrative examples indicate the application of my process in connection with two of the more important raw materials commercially available. It is understood that I am not to be limited by the definite quantities, materials and methods of procedure mentioned herein.

Example 1.—455 pounds of beet molasses containing approximately 55% total sugars, is diluted with approximately 100 gallons of water and to this mixture is added 10 pounds of a material containing 50% animal protein (commercially known as "cracklings" which is described hereafter). The whole is mixed in a suitable pressure cooker, brought to boiling and submitted to 20 minutes steam sterilization under approximately 15 pounds pressure. The sterilized mixture is transferred into a sterile 1500 gallon container where it is cooled by admixture with ordinary tap water. The mixing water is added at such temperature that the final mash when reaching 6% concentration by weight of molasses used is 37° C. or slightly higher. To this mixture is added 35 gallons of previously prepared culture of Bacillus butacone. The resultant mixture is maintained at 37° C. until gas evolution has substantially ceased. Analysis of the final mash reveals that 36.5% of the total sugars originally present in the mash have been converted into solvents. The fermentation was completed in 40 hours. The solvent mixture resulting consists of 2% ethyl alcohol, 28% acetone and 70% butyl alcohol.

The culture used above is prepared exactly as previously described in this specification.

Example 2.—Approximately 18 litres of mash are sterilized at 15 pounds steam pressure for 30 minutes. The mash consists of 900 grams of pure inverted sucrose plus 18 grams of animal protein material made up to 18 litres with water. After sterilization the mash is cooled to 37° C. and inoculated with 500 cc. of previously prepared culture of Bacillus butacone. The mixture is maintained at 37° C. for 50 hours at which time gas evolution has substantially ceased. Upon analysis it is found that 34% of the original sugars in the mash have been converted into solvents, the proportions of which are 6% ethyl alcohol, 29% acetone and 65% butyl alcohol.

The protein material used is animal protein or a mixture of animal with vegetable protein. Of the readily available animal protein materials, I have found a very satisfactory composition may be obtained in commercial quantities and at reasonable cost from meat packing establishments, being frequently sold under the name of "cracklings" in the form of a finely divided dried meal free from all but small amounts of fats. While the protein percentage necessarily varies, I have obtained satisfactory results from the use of "cracklings" which average between 50% and 55% by weight of protein and in which the fat is below 5% by weight.

The vegetable proteins are readily obtained commercially and at reasonable cost from milling and feed supply houses. Commercial corn glutin, wheat glutin and similar vegetable protein combinations are used by me.

What I claim is:

1. A process comprising the preparation of a mash wherein blackstrap molasses is first diluted with approximately equal volume of water, adding thereto "cracklings", (animal protein matter) to the extent of approximately 2% by weight of molasses used, then sterilizing the resulting mixture during thorough agitation under approximately 15 pounds steam pressure for a period of 15 minutes to 45 minutes; diluting this sterilized mixture with ordinary tap water at such temperature that the final mixture which contains normally 2% to 5% carbohydrates by weight will be 37° to 40° C.; transferring this mash to tanks, fermenting the said mash with a culture of *Bacillus butacone* at about 37° C. until the carbohydrates are largely canverted into acetone, ethyl alcohol, butyl alcohol and fermentation gases, and finally recovering and purifying the finished products therefrom.

2. The process of making butyl alcohol, ethyl alcohol, and acetone products, which includes the steps of providing carbohydrate mash of the class consisting of starch and sugar mashes, incorporating with the said mash a culture of the herein-described *Bacillus butacone*, allowing the fermentation to proceed until production of gases has substantially ceased, and recovering the said products.

3. The process as in claim 2, and wherein protein matter is also incorporated.

4. The process of making butyl alcohol, ethyl alcohol, and acetone products, which comprises the steps of providing carbohydrate material of the class consisting of starches and sugars, incorporating therewith a culture of the herein-described *Bacillus butacone*, maintaining the inoculated mash at a temperature of about 34-40° C. while allowing the fermentation to proceed until gas formation is substantially complete, and recovering the said products.

5. The process of making butyl alcohol, ethyl alcohol, and acetone products, which comprises the steps of providing a watery mash of water-soluble saccharine matter, incorporating therewith a culture of the herein-described *Bacillus butacone*, maintaining the inoculated mash at a temperature of about 34-40° C. while allowing the fermentation to proceed until gas formation is substantially complete, and recovering the said products.

6. The process of making butyl and ethyl alcohol and acetone products from carbohydrate material of the class consisting of starches and sugars, which comprises the steps of sterilizing said carbohydrate material together with a relatively small portion of the water to be used in forming the mash, admixing unsterilized water with the said sterilized carbohydrate-containing material to complete the mash, incorporating a culture of the herein-described *Bacillus butacone*, allowing fermentation to proceed until the production of gases is substantially complete, and recovering the said products.

7. The process as in claim 6, and wherein the mash contains about 3-5% of carbohydrates and is held during fermentation at about 37-40° C.

8. The process as in claim 6, and wherein animal protein material is incorporated before sterilization.

9. The process as in claim 6, and wherein animal protein material is incorporated before sterilization and the completed mash contains about 3-5% of carbohydrates and is held during fermentation at about 37-40° C.

10. The process of making butyl and ethyl alcohol and acetone products by fermentation of carbohydrate material of the class consisting of starches and sugars, which comprises diluting said carbohydrate material to a free-flowing consistency, sterilizing the resulting mixture by heat, admixing unsterilized water with the said mixture in excess of the quantity of water added before sterilization, inoculating with a culture of the herein-described Bacillus butacone, allowing the inoculated mash so prepared to ferment until gas production is substantially complete, and recovering the said products.

11. The process as in claim 10 and wherein protein matter, in amount of about ½% to 1% of the carbohydrate material by weight, is added prior to sterilization.

12. The process of producing butyl and ethyl alcohol and acetone products from water soluble carbohydrate mash of the class consisting of starch and sugar mashes, which comprises the steps of diluting the carbohydrate material with a relatively small proportion of water, adding protein matter in the proportion of about ½% to 1% on weight of carbohydrate material, sterilizing by heat of steam at approximately 15 lbs. per sq. in., diluting the mixture with unsterilized water to about 3-5% of carbohydrate content, incorporating a culture of the herein-described Bacillus butacone, allowing the inoculated mash to ferment at about 37°-40° C. until gas evolution has substantially ceased, and recovering the said products.

HORACE EDWARD HALL.